Patented Oct. 7, 1930

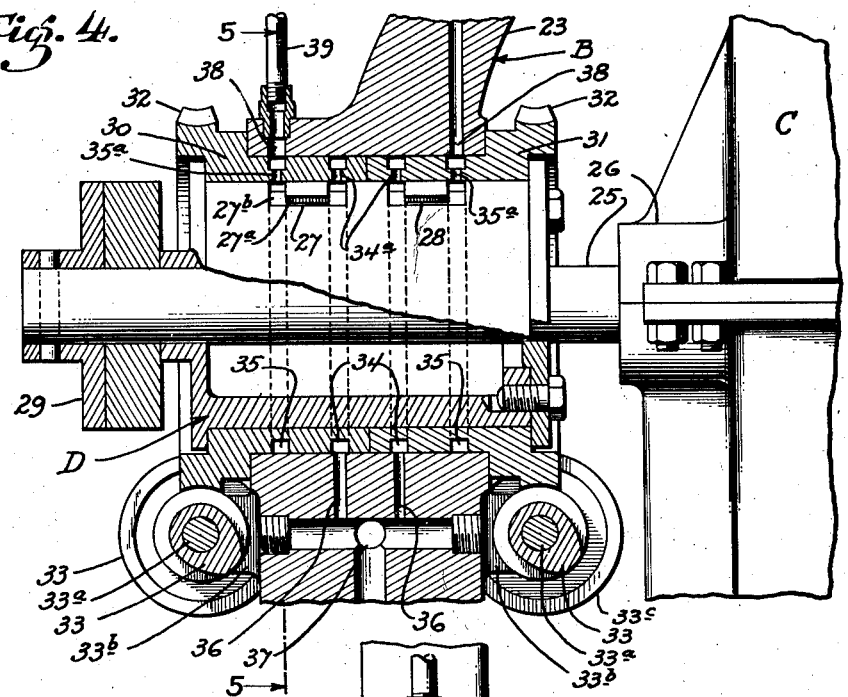
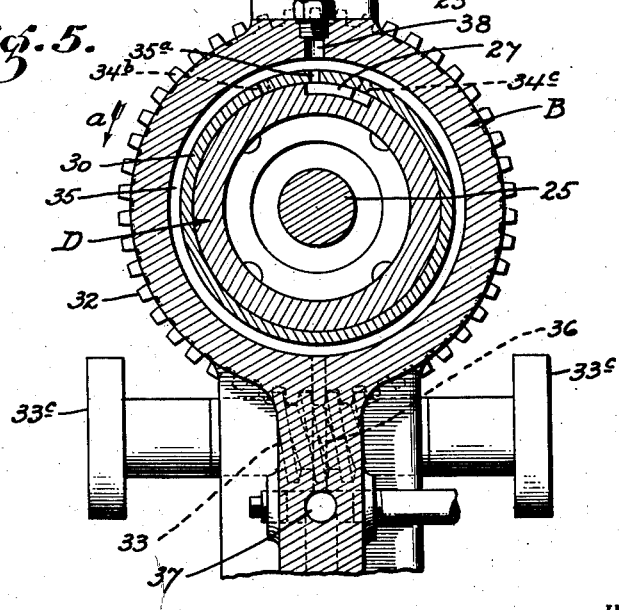

1,777,758

UNITED STATES PATENT OFFICE

HOLGER T. MATHIESON, OF SAN FRANCISCO, CALIFORNIA, ASSIGNOR TO ILLINOIS PACIFIC GLASS CORPORATION, OF SAN FRANCISCO, CALIFORNIA, A CORPORATION OF DELAWARE

VALVE DRIVING AND TIMING MECHANISM

Application filed August 13, 1928. Serial No. 299,196.

This invention relates to a valve, whereby the flow or delivery of a fluid under pressure may be controlled, and especially to means for driving and timing the valve.

In the operation of machines for the molding of glassware, such as bottles and the like, a number of cooperating mechanisms are required, such as the glass furnace, the mechanism whereby the molten glass is discharged from the furnace in the form of gobs, the shear mechanism whereby the gobs are cut off and their length and weight determined, the chute mechanism for directing the gobs to the molds, mechanism for transmitting an intermittent movement to the turret whereby the molds are carried, etc.

The several mechanisms referred to are usually pneumatically operated, and means must accordingly be provided whereby air or another fluid under pressure is delivered at the proper moment to actuate the mechanism, as close timing and coordination between the several mechanisms must be maintained if uniformity of product, output and efficiency are to be obtained.

The object of the present invention is to provide a valve mechanism, whereby air or a like fluid medium, under pressure, may be intermittently directed to a number of fluid-actuated mechanisms which cooperate with each other; to provide a valve of the rotary type; to provide a variable speed drive whereby the revolutions of the valve may be increased or decreased as conditions may demand; and to provide a manual adjustment whereby the timing of the valve may be advanced or retarded regardless of the speed of rotation.

One form of the valve and the driving mechanism employed is shown by way of illustration in the accompanying drawings, in which—

Fig. 4 is a detail, sectional view of one of the timing valves.

Fig. 5 is a cross section, taken on line 5—5 of Fig. 4.

Figure 1:
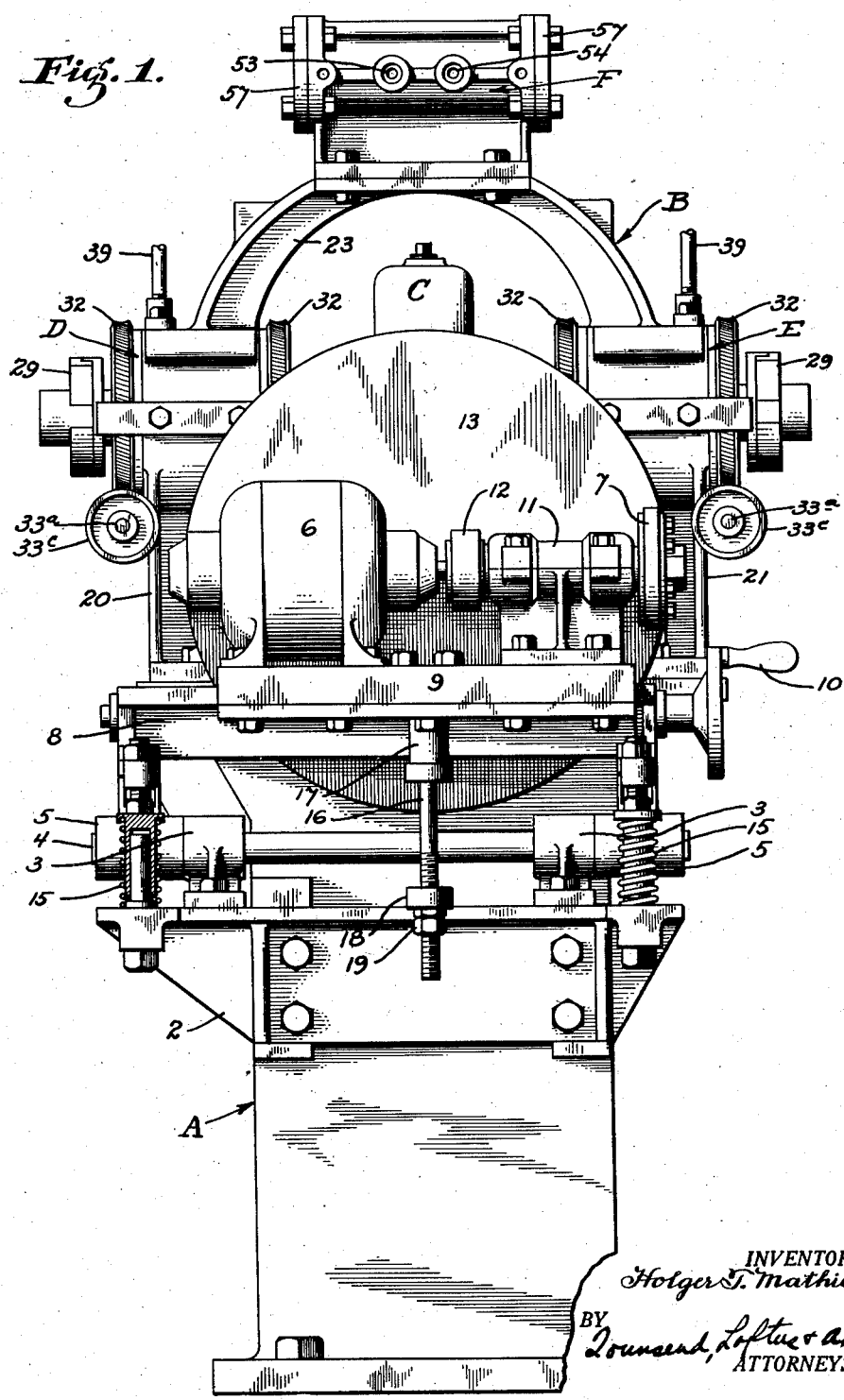
Fig. 1 is a front view of the valve mechanism, said view also showing the variable speed drive whereby the valves are driven.
Figure 2:
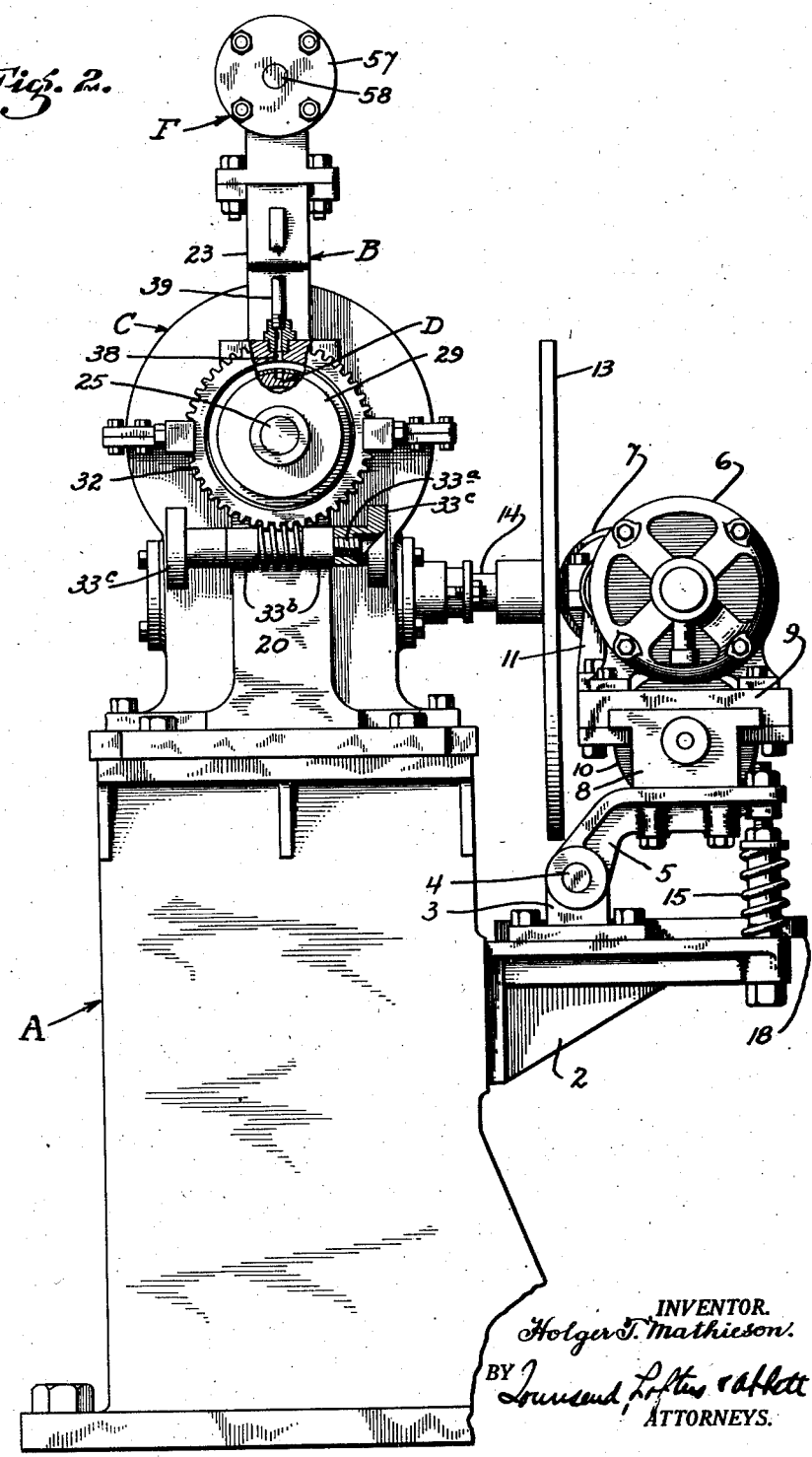
Fig. 2 is a side elevation of the valve mechanism and the variable speed drive.
Figure 3:
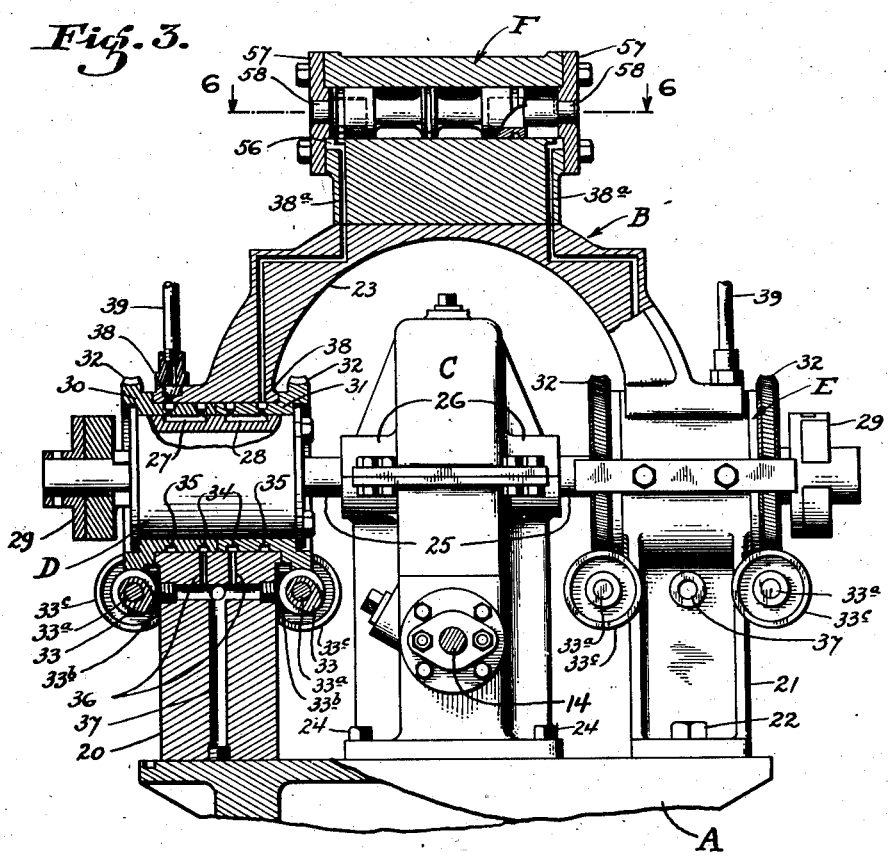
Fig. 3 is a partial longitudinal section, showing one of the valves in section and another of the valves partially in section and partially broken away.

Referring to the drawings in detail, and particularly Figs. 1, 2 and 3, A indicates a base frame, on the front side of which is supported, by means of bracket arms 2, a pair of bearing members 3. Extending through the bearing members is a shaft 4, and secured thereon is a pair of arms 5 which form a support for a driving mechanism comprising an electric motor 6 and a friction wheel 7 which is driven thereby. The arms 5 are connected by a cross-head bar 8 and a cross-head 9 is slidably mounted thereon, said cross-head being movable from end to end of the cross-head guide 8 by a standard form of worm gear feed, actuated by a crank mechanism, generally indicated at 10.

The cross-head 9 serves as a support for the electric motor 6 and a bearing 11, which, in turn, forms a support for the friction wheel 7, the friction wheel being secured on the shaft journaled in the bearing member 11 and connected with the motor 6 through a flexible coupling 12. The friction wheel 7 bears or contacts with a friction driven disk 13, secured on the outer end of a shaft 14, and a predetermined pressure may be exerted between the wheel 7 and the disk 13 by means of springs 15, interposed between the outer ends of the arms 5 and the bracket arms 2.

The whole driving unit, to-wit, the motor and the friction wheel 7, is, in other words, pivotally mounted with relation to the friction disk 13, as the arms 5, supporting the cross-head guide and the cross-head 9, are pivotally supported with relation to the bearings 3; the springs 15 insuring a driving contact between the wheel 7 and the disk 13 and an adjusting rod 16 limiting the pivotal movement so that the amount of pressure exerted may be varied regardless of the spring tension. That is, the rod 16 is attached at its upper end to the cross-head guide 8, as at 17, while the lower end of the rod projects through a plate 18 connecting the bracket arms 2. The lower end of the rod is threaded and provided with nuts 19 so as to permit an adjustment which limits swinging or pivotal movement of the driving unit with relation to the friction driven disk 13.

Supported by the base frame A is a secondary frame B, which is substantially U-shaped when viewed from the front. That is, the secondary frame consists of two main upright arms 20 and 21 which are secured to the base frame A by means of bolts 22, or the like. The upper ends of the arms 20 and 21 are connected by a rounded section 23 and a central opening or space is thus formed between the arms. This space is occupied by a housing, generally indicated at C, this housing being also secured to the base frame A by means of bolts 24. The shaft 14, supporting the friction driven disk 13, extends through the housing C and is journaled therein. A second shaft, generally indicated at 25, also extends through the housing C but at right angles to the shaft 14. The shaft 25 is journaled in the housing C, as indicated at 26, and it is driven from shaft 14 through reduction gears not here illustrated.

Formed on the arms 20 and 21 of the secondary frame B are two aligned openings in which are mounted valves, generally indicated at D and E. These valves are identical in construction and operation and the description of one should accordingly suffice. The valve, indicated at D, is best illustrated in Figs. 3, 4 and 5. It consists of a cylindrical, elongated-shaped shell, in the outer surface of which is formed a pair of E-shaped channels, as indicated at 27 and 28. The valve is hollow, as shown, and the shaft 25 extends completely through the same. A universal coupling 29, on the outer end of the shaft, forms a driving connection between the shaft and valve so it will rotate in unison with the shaft. The valve D is journaled in a pair of sleeves, generally indicated at 30 and 31. These sleeves are also free to rotate with relation to the valve housing, which, in reality, is nothing more nor less than the upright arm 20. But while they are free to rotate, it must be understood that they are not power driven but merely manually driven; manual rotation being accomplished by forming a worm gear 32 on the outer end of each valve which meshes with a worm pinion 33. These worm pinions are secured on shafts 33$^a$, journaled in bearings 33$^b$ formed on the outer faces of the arms 20 and 21 or the valve housings.

The outer ends of the shaft 33$^a$ are provided with hand-wheels 33$^c$, and the worm pinions 33 may thus be rotated either from the front or the rear side of the base frame A, and when so rotated rotary motion is transmitted to the timing sleeves 30 and 31, as the case may be. Each of the timing sleeves is provided with a pair of annular grooves, as indicated at 34 and 35. The grooves 34 are at all times in communication with a pair of air inlet ports 36 and these are, in turn, in continuous communication with an inlet passage 37, to which air under pressure from any suitable source is supplied. The annular grooves, indicated at 35, are in continuous communication with outlet ports 38, formed in the arm 20 or the valve housing proper, and the outlet ports are, in turn, connected with a mechanism to be actuated through pipes or the like indicated at 39.

The flow of air through the valve will be as follows: The moment air under pressure is admitted to the connection, indicated at 37, the annular grooves 34 will also be supplied with air as they are in communication with the connection 37 through the ports 36.

Valve D, as previously stated, has an E-shaped channel 27 formed in its outer surface. The leg of the E, indicated at 27$^a$, is equal in length to the distance between the annular channels 34 and 35 while the arms of the E, indicated at 27$^b$, may be of any suitable length. The E-shaped channel serves four functions:

First, that of connecting the annular channels 34 and 35 so that air under pressure may flow from the channel 34 over and into the channel 35 and from there out through the outlet ports 38.

Second, that of determining the time when the connection between the channels 34 and 35 is made.

Third, that of determining the time period of the connection.

Fourth, that of opening and closing the air flow through the outlet 38 which is the main function.

The timing sleeve, besides having the annular channels 34 and 35 formed therein, is also provided with two radial ports, as indicated at 34$^a$ and 35$^a$. These ports are necessary, due to the fact that the channels 34 and 35 are formed in the exterior surface of the timing sleeve and also due to the fact that the E-shaped channel 27 is formed on the exterior surface of the valve D. Hence if air is to be by-passed from the channel 34 to the channel 35 it must first enter the channel 34. It must then pass inwardly through the ports 34$^a$ when the E-shaped channel registers therewith. The air is then by-passed through the E-shaped channel and passes outwardly through the radial port 35$^a$ into the annular channel 35 and as the outlet port 38 on the valve housing communicates therewith a complete air circuit is established and air will discharge into and through the connecting pipe 39. The time period that the communication is established depends upon the length of the arms 27ᵇ of the E-shaped channel. If air is to be supplied for only a short period, the arm 27ᵇ is made short, and if a longer period of air supply is required the length of the arm 27ᵇ is proportionately increased.

From the foregoing description it will be seen that valve D serves several important functions already referred to, to-wit, a main function which is that of opening or shutting off communication between the inlet port 36 of the valve housing and the outlet port 38 as no air flow can take place except when the E-shaped slot 27 is in register with the radial ports 34ᵃ and 35ᵃ. Hence air flow through the outlet port 38 is intermittent and only takes place once during each rotation of the valve D. The amount of air flow when communication is made or the length of the time period through which air is permitted to flow is dependent upon the length of the arms 27ᵇ. The length of the time period that the air flow is shut off or stopped depends upon the speed of rotation of the valve, and as the valve is driven from the motor 6 through the friction drive 7 and the gear reduction drive C, practically any number of revolutions per minute desired may be obtained by sliding the cross-head or carriage 9 inwardly or outwardly with relation to the center of the friction driven disk 13. Hence by varying the speed of rotation it is possible to not only vary the time period when the air is shut off, but it is also possible to vary the time period when the air is flowing.

There is another important feature in connection with the valve which should be considered, and that is the timing sleeve 30. This is manually rotatable with relation to the valve D and with relation to the stationary housing 20. The timing sleeve, as already stated, is provided with two radial ports 34ᵃ and 35ᵃ. If they align with the outlet port 38 the air will discharge once every revolution at a predetermined time. If the timing sleeve is rotated in the direction of arrow $a$ (see Fig. 5) so that the ports 34ᵃ and 35ᵃ assume the dotted line position indicated at 34ᵇ the period of air discharge will be advanced and the timing of the discharge will be altered. On the other hand, if the timing sleeve is rotated in the direction opposite to arrow $a$ and the ports 34ᵃ and 35ᵃ assume the position indicated by dotted lines at 34ᶜ, the timing of the air discharge will be retarded; hence making it possible to advance or retard the time of air discharge regardless of the speed of rotation of the valve E which normally rotates in a clockwise direction, as indicated by the arrow in Fig. 5.

The importance of advancing or retarding the period of air discharged from the valve will, perhaps, be better understood if the following conditions are considered: In the operation of a glass plant it sometimes happens that the temperature of the molten glass varies. If the temperature is comparatively high the viscosity of the molten glass is less and more of it will discharge during a given period of time. Conversely, if the temperature of the molten glass is lower the viscosity of the glass will increase and a smaller quantity of glass will discharge during a given period.

The shearing mechanism which cooperates with the discharge of the glass furnace serves the function of cutting off the gob of glass discharging and if the shear is operated at given time intervals the length and weight of the gob will vary with the temperature. Hence if a gob of a predetermined weight is required, regardless of temperature, the shearing mechanism must be advanced or retarded as the case may be. That is, it must operate or function, for instance, thirty times a minute if the temperature of the glass is low and thirty-three times a minute if the glass temperature is fairly high. In other words, the shearing mechanism is merely speeded up or slowed down, as the case may be, and this is accomplished in the present instance by slightly increasing or decreasing the speed of the variable drive transmission.

It has been previously stated that the molten glass or gob was delivered to the mold proper by a directing chute. In some instances the chutes move to and away from the shearing mechanism and it is accordingly necessary to increase or decrease the speed of the chute movement so that it will cooperate and coordinate by the increase or decrease in speed of the shearing mechanism. In fact, glass timing and coordination must be maintained throughout the entire process of manufacture; that is, from the discharge of the glass until the molded article is substantially completed. It is for this reason that it is important to provide a controlling mechanism in the form of a valve which is capable of varying minor adjustments such as increase or decrease in speed, advancing and retarding of the time of air discharge, control of the time period when air is discharging, etc. All these features are taken care of by the present mechanism and minor adjustments may be made while the machine is running, either by increasing or decreasing the speed of the variable speed friction transmission mechanism or by manually adjusting the timing valves 30 and 31.

Figure 6:
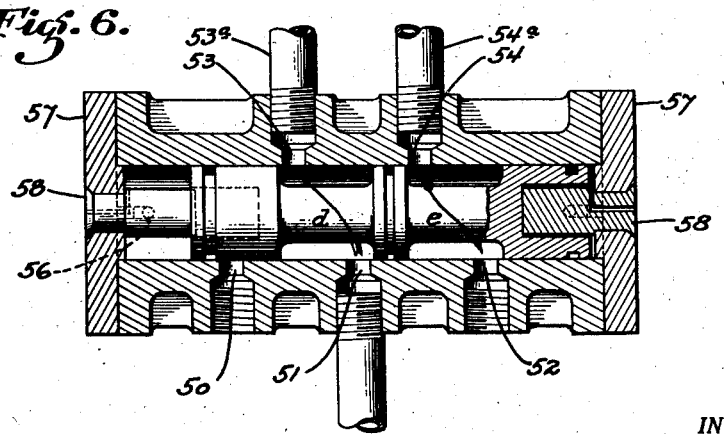
Fig. 6 is a plan section, taken on line 6—6 of Fig. 3.

The valve in reality functions in the manner similar to a cam shaft. The cams on an ordinary cam shaft would open and close valves which will regulate the air flow. In fact, this has been common practice in glass machines to employ such cam shafts, but it has been proven that the valve mechanism, such as here described, is more practical and minor adjustment, both in speed of rotation and advance or retardation of one valve with relation to the other, can be taken care of while the machine is in operation; hence eliminating the necessity of shutting down for minor adjustments which is necessary where a cam shaft is employed.

Where a mechanism or several cooperating mechanisms are individually and pneumatically operated a cylinder and piston are required for each mechanism. The air admitted by the valve D serves the function of supplying air to the cylinder to move the piston in one direction or the other. In some instances the capacity of the valve D is not sufficient to supply the quantity or volume of air under pressure required. In that instance an intermediate valve may be employed, as generally shown at F in Figs. 3 and 6. The valve body, indicated at 20, has two outlet ports, as indicated at 38. The outlet port near the inside of the arm communicates with one end of the cylinder in which the valve is operable, while the other end of the cylinder is in communication with a passage 38ª which communicates with the valve F. The cylinder containing the valve F is best illustrated in Fig. 6. It is provided with three ports on one side, as indicated at 50, 51 and 52, and with two ports on the opposite side, as indicated at 53 and 54. The ports 53 and 54 are connected through means of pipes 53ª and 54ª with the cylinder and piston to be actuated. The port 51 serves as an air inlet port and it is connected with any suitable source of supply.

When air is delivered by valve D and the timing sleeve 31 to the outlet port 38 it enters the cylinder containing the valve F at the point indicated at 56. The pressure is sufficient to force the valve into the position shown in Fig. 6. When this position is assumed, air will pass through the valve in the direction indicated by the arrow $d$ and pipe 53ª will convey the air to the cylinder and piston to be actuated. The other pipe 54ª, which is also connected with the cylinder, will serve as an exhaust pipe as the air previously delivered will discharge into the pipe 54ª and will pass through the valve in the direction indicated by the arrow $e$.

The cylinder is provided with a head member 57 at each end and each head is provided with a plug 58 having a small vent opening formed therein. When air is admitted to the opposite end of the cylinder through the port 38 the piston is moved to the position shown in Fig. 3 and the inlet port 51 will then communicate with the port 54 and the pipe 54ª, while pipe 53ª will communicate with the port 50. Hence air under pressure will be delivered to the cylinder which is being actuated through the pipe 54ª while the pipe 53ª will serve as an exhaust pipe. For this reason it will be noted that the ports 53 and 54 alternately operate as exhaust and inlet ports, port 51 always functions as an inlet port and ports 50 and 52 will always function as exhaust ports. The vented plugs 58 serve as exhaust ports for the cylinder containing the valve F.

The reason for illustrating the valve F and the cylinder in which it functions is only one, and that is to show that the valves D and E may not only function to deliver air to the cylinder of a pneumatically operated machine but they may also function to deliver air to intermediate valve mechanism which is capable of supplying a greater quantity of air where needed.

While the valve mechanism has been described in conjunction with glassware manufacturing machinery, it is obvious that numerous other applications may be made, as it may be used where there are one or more mechanisms pneumatically actuating and cooperating with each other.

Having thus described my invention, what I claim and desire to secure by Letters Patent is—

1. In a device of the character described, a valve housing having an outlet port and an inlet port formed therein in communication with a source of fluid supply under pressure, a valve rotatably mounted in the housing and adapted during rotation to open and close communication between the ports, means interposed between the valve and the valve housing ports whereby communication between the ports may be advanced or retarded with relation to the rotating valve, and a variable speed friction driving transmission connected with the valve whereby the valve may be rotated at any desired speed within the range of the friction driving mechanism.

2. In a device of the character described, a valve housing having an outlet port and an inlet port formed therein in communication with a source of fluid supply under pressure, a valve rotatably mounted in the housing and adapted during rotation to open and close communication between the ports, a timing sleeve interposed between the valve and the housing, said sleeve having a pair of ports formed therein in continuous communication with the inlet and outlet ports in the valve housing, said timing sleeve ports adapted to be opened and closed by the rotary valve, manually controlled means for imparting rotation to the timing sleeve to change the position of its ports with relation to the valve whereby communication between the inlet and outlet ports is advanced or retarded and a variable speed friction driving mechanism connected with the valve whereby the valve may be rotated at any desired speed within the range of the driving mechanism.

3. In a device of the character described, a valve housing having an outlet port and an inlet port formed therein in communication with a source of fluid supply under pressure, a sleeve journaled in said housing, said sleeve having a pair of annular channels formed therein, one in communication with the inlet port and one in communication with the outlet port in the valve case, a pair of radial ports also formed in the sleeve, one communicating with the first named channel and one in communication with the second named channel, and a rotary valve journaled in the sleeve and adapted during its rotation to form communication between the radial ports in the sleeve.

4. In a device of the character described, a valve housing having an outlet port and an inlet port formed therein in communication with a source of fluid supply under pressure, a sleeve journaled in said housing, said sleeve having a pair of annular channels formed therein, one in communication with the inlet port and one in communication with the outlet port in the valve case, a pair of radial ports also formed in the sleeve, one communicating with the first named channel and one in communication with the second named channel, a rotary valve journaled in the sleeve and adapted during its rotation to form communication between the radial ports in the sleeve, and means for imparting a rotary movement to the sleeve to change the position of its radial ports with relation to the valve.

5. In a device of the character described, a valve housing having an outlet port and an inlet port formed therein in communication with a source of fluid supply under pressure, a sleeve journaled in said housing, said sleeve having a pair of annular channels formed therein, one in communication with the inlet port and one in communication with the outlet port in the valve case, a pair of radial ports also formed in the sleeve, one communicating with the first named channel and one in communication with the second named channel, and a rotary valve journaled in the sleeve, said valve having a channel formed in its outer surface which is adapted to establish communication between the radial ports in the sleeve once during each rotation of the valve.

6. In a device of the character described, a valve housing having an outlet port and an inlet port formed therein in communication with a source of fluid supply under pressure, a sleeve journaled in said housing, said sleeve having a pair of annular channels formed therein, one in communication with the inlet port and one in communication with the outlet port in the valve case, a pair of radial ports also formed in the sleeve, one communicating with the first named channel and one in communication with the second named channel, a rotary valve journaled in the sleeve, said valve having a channel formed in its outer surface which is adapted to establish communication between the radial ports in the sleeve once during each rotation of the valve, and means for rotating the sleeve to change the position of its ports with relation to the channel in the valve.

7. In a device of the character described, a valve housing having a pair of outlet ports and a pair of inlet ports formed therein and in communication with a source of fluid supply under pressure, a pair of sleeves journaled in the valve housing, each sleeve having an annular channel formed therein in communication, one with each outlet port, each sleeve also having a second annular channel formed therein in communication, one with each inlet port, each sleeve also having a pair of radial ports formed therein, one port in each sleeve in communication with a channel which communicates with the outlet port, and the other radial port in each sleeve being in communication with a channel which communicates with the inlet port, a valve journaled in the sleeves, said valve having two separated channels formed therein, and means for rotating the valve so that the channels will form communication between the radial ports in each sleeve once during each revolution of the valve.

8. In a device of the character described, a valve housing having a pair of outlet ports and a pair of inlet ports formed therein and in communication with a source of fluid supply under pressure, a pair of sleeves journaled in the valve housing, each sleeve having an annular channel formed therein in communication, one with each outlet port, each sleeve also having a second annular channel formed therein in communication, one with each inlet port, each sleeve also having a pair of radial ports formed therein, one port in each sleeve in communication with a channel which communicates with the outlet port, and the other radial port in each sleeve being in communication with a channel which communicates with the inlet port, a valve journaled in the sleeves, said valve having two separated channels formed therein, means for rotating the valve so that the channels will form communication between the radial ports in each sleeve once during each revolution of the valve, and means for imparting a rotary movement to each sleeve independently of the other so as to change the position of their radial ports with relation to the channels in the valve.

9. In a device of the character described, a valve housing having a pair of inlet ports and a pair of outlet ports in communication with a source of fluid supply under pressure, a cylindrical valve rotatably mounted within the housing and adapted during rotation to open and close communication between said inlet and outlet ports, and means whereby communication between either of said inlet ports and its respective outlet port may be independently advanced or retarded with relation to the rotating valve.

10. In a device of the character described, a valve housing having a pair of inlet ports and a pair of outlet ports in communication with a source of fluid supply under pressure, a cylindrical valve rotatably mounted within the housing and adapted during rotation to open and close communication between said inlet and outlet ports, two rotatable cylindrical members interposed between said housing and valve whereby communication between either of said inlet ports and its respective outlet ports may be independently advanced or retarded, and means for manually rotating said members from the exterior of the casing during the operation of the valve.

11. In a device of the character described, a valve housing having an outlet port and an inlet port in communication with a source of fluid supply under pressure, a rotatable valve within the housing, a rotatable sleeve between the housing and the valve having annular channels communicating with said ports, means whereby rotation of said valve will cause intermittent communication between said ports through said channels, and means whereby rotation of said sleeve will advance or retard said communication.

12. In a device of the character described, a valve chest, a piston valve reciprocally mounted in said chest, said chest having ports formed in opposite ends, means whereby fluid may be supplied to said ports for reciprocating the piston, said means comprising a pair of housings having inlet ports in communication with a source of fluid supply under pressure, outlet ports in communication with the ports in said valve chest, cylindrical valves rotatably mounted within the housing adapted during rotation to open and close communication between the ports, and means whereby communication between the ports may be advanced or retarded with relation to the rotating valve.

13. In a device of the character described, a valve chest having an inlet port, discharge ports, and exhaust ports formed therein, a piston valve reciprocally mounted therein for the control of a fluid passing through said ports, said mechanism being adapted to control a relatively large fluid supply and means for reciprocating the piston in said chest, said means comprising a pair of valves adapted to supply a relatively small volume of fluid alternately to said valve chest at opposite ends of said piston.

14. In a device of the character described a valve chest, a piston valve reciprocally mounted in the chest, said chest having ports formed in its opposite ends through which a relatively small amount of fluid is admitted to impart reciprocal movement to the valve, means whereby the reciprocation of said piston valve will control the flow of a relatively large volume of fluid through the chest and means controlling the flow of the relatively small amount of fluid, said means comprising a pair of housings having inlet ports in communication with the end ports in said valve chest, cylindrical valves rotatably mounted within the housing adapted during rotation to open and close communication between the ports, and means whereby communication between the ports may be advanced or retarded with relation to the rotating valve.

HOLGER T. MATHIESON.